July 22, 1947.  H. G. JUNGK  2,424,318
EQUALIZED SINGLE PHASE TRACTION MOTOR
Filed Dec. 8, 1944  2 Sheets-Sheet 1

WITNESSES:

INVENTOR
Herbert G. Jungk.
BY
ATTORNEY

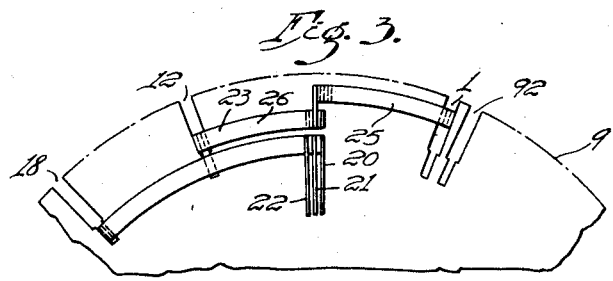
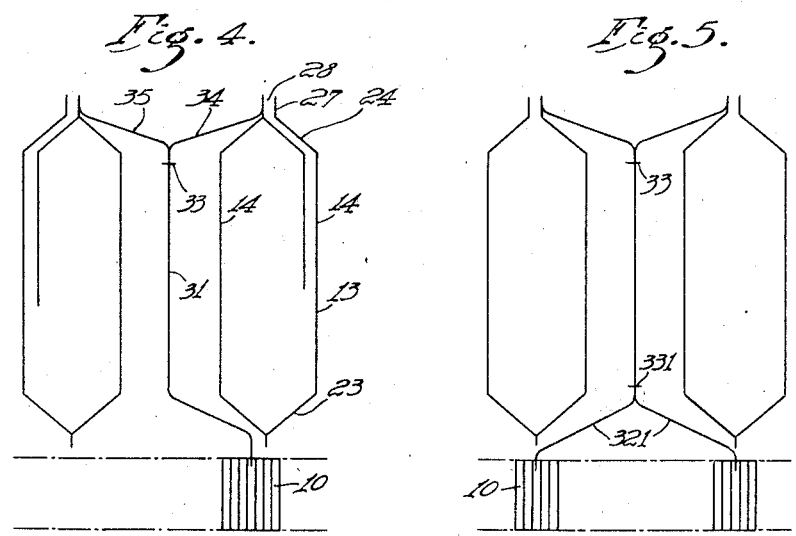
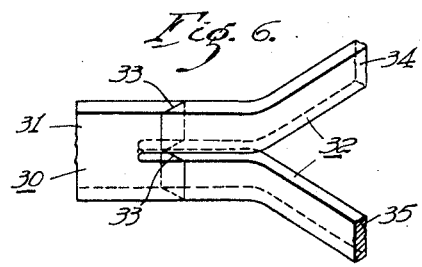

UNITED STATES PATENT OFFICE 2,424,318

EQUALIZED SINGLE-PHASE TRACTION MOTOR

Herbert G. Jungk, Wilkinsburg, Pa., assignor to Westinghouse Electric Corporation, East Pittsburgh, Pa., a corporation of Pennsylvania Application December 8, 1944, Serial No. 567,225

10 Claims. (Cl. 171—206)

My invention relates to the type of commutator-motor (usually alternating-current) which requires both equalizing cross-connections and resistance-leads in the armature windings, in order to commutate successfully. My invention was particularly devised for single-phase series commutator railway traction motors, for railway systems which operate with direct-current, in some sections, and with alternating-current in other sections of the line, but my invention is not limited to these particular motors.

Various forms of resistance-leads have been known, for a long time, and various forms of equalizing cross-connections and equalizer-rings have been known, for a long time. Single-phase series commutator motors have also been known, provided with both equalizing cross-connections and resistance-leads, but in no such case, heretofore, has any means or arrangement been devised, whereby there was room in any practical construction, for both resistance-leads and equalizers, with full equalization, that is, an equalizing connection for every commutator bar, or for every junction between the several resistance-leads and the armature-winding. Invariably, heretofore, there has not been room for complete equalization of resistance-lead motors, and the construction has been quite costly, even with incomplete equalization.

The principal object of my invention is to provide a new type of resistance-lead connection which includes one portion of a relatively high-resistance material, lying in the bottom of the armature-core slot, and having a forked or double end-winding terminal-connection, of a relatively low-resistance material, joined to at least one end of the high-resistance portion, the two leads of this terminal-connection fanning out in opposite directions, with throws extending clockwise and counterclockwise, respectively, to two equipotential points, spaced two pole-pitches apart, on either the rear end of the armature winding, or on the commutator, or both. In this manner, the low-resistance terminal-connections serve as equalizing cross-connections.

In the drawings,

Fig. 1 is a longitudinal sectional view of a commutating motor embodying my invention;

Figs. 2 and 3 are fragmentary rear-end and front-end views, respectively, showing the arrangements of the terminal end-winding portions and connections of the armature.

Fig. 4 is a fragmentary schematic diagrammatic development-view illustrative of the winding of the motor shown in Figs. 1 to 3.

Fig. 5 is a view similar to Fig. 4, showing a modification having equalizing cross-connections for the commutator as well as the armature-winding, and Fig. 6 is a fragmentary perspective detail, showing the connection between the high-resistance lead-portion and the copper terminal-connections thereof.

In the drawings, I have shown a single-phase alternating-current direct-current series commutator motor, comprising a stationary field-member 7, and a rotor-member 8 which is rotatably supported within the field-member. The rotor-member 8 comprises an armature core 9 having 92 slots, of which slots numbers 1, 12, 17, 18, 87 and 92 are indicated in Figs. 2 and 3. The rotor-member 8 also comprises a multi-bar commutator 10 which is disposed at the front end of the armature-core 9. This commutator has three times as many commutator-bars as there are armature-slots, or 276 commutator-bars, of which number, bars 20, 21 and 22 are indicated in Fig. 3.

The armature-core 9 carries an armature-winding 11, comprising 276 armature-coils 13 which are serially connected in a closed armature-winding circuit. Each armature-coil 13 comprises two coil-side portions 14, lying in two different layers 15 and 16 in two different slots of the armature-core. Each armature-coil 13 further comprises front-end end-winding portions 23 and rear-end end-winding portions 24, each disposed in two layers 25 and 26 of winding-conductors having throws in opposite directions around the rotor-member, so that each of the end-windings comprises a double-layer double-throw half-diamond-type end-winding assembly, by which term I mean to refer to the ordinary type of end-turn conductors which look like a series of V's when laid out in a development plan, as in Figs. 4 and 5. Each armature-coil 13 has two coil-ends 27 and 28, extending to the rear.

A resistance-lead connection 30 extends from each bar of the commutator 10 to the rear. Each resistance-lead connection has its central portion, or its central and front-end portion 31, made of Monel metal, or other relatively high-resistance material. These portions of the several resistance-lead connections lie in the bottoms of the slots of the armature-core 9. Each resistance-lead connection 30 also has a special rear-end copper terminal 32 which is brazed to the rear end of the high-resistance portion 31 by a well known kind of scarfed joint 33, which is shown in detail in Fig. 6, and which is in accord with a known practice, except that, in the present case, the copper-terminal portion 32 is in the form of a double-throw double-layer end-winding terminal, made of copper or other relatively low resistance material, having two branches or conductor-members 34 and 35, disposed in two different end-turn layers, fanning out in different directions, with clockwise and counterclockwise throws around the rotor-member, to terminate at two equi-potential armature-winding coil-ends 27 or 28, which are two pole-pitches apart.

A series of radially extending rear-end connectors 36 are provided, each connector joining two coil-ends 27 and 28 of two serially connected armature-winding coils 13, and also joining these coil-ends to two oppositely fanning end-winding terminals 34 and 35, coming in opposite directions from two different high-resistance lead-portions 31, as shown in Fig. 2. In this manner, all of the rear-end armature-coil equi-potential connection-points which are spaced two pole-pitches from each other, are connected together through a low-resistance circuit which is made up of the several branches 34 and 35 of the several copper members 32 of different resistance-lead connections 30, so that the double-throw end-winding turns 32 of the resistance-lead connections 30 serve as equalizing cross-connections for the armature-winding. It is noted that one of these equalizing cross-connections is provided for each and every junction-point between the successive serially connected armature-coils 13 of the closed armature-winding circuit.

The invention could otherwise be described by saying that the rear end of the armature-winding 11 is provided with double-layer double-throw half-diamond-type rear-end equalizing cross-connections 32, having their rearward diamond-points connected at 36 to successive rear-end connections between successive pairs of armature-coils 13, and having their forward diamond-points connected at 33 to a resistance-lead connection which may be thought of as starting at this point 33, and extending forward, in the bottom of an armature-slot, in the form of the high-resistance portion 31.

In the form of my invention which is shown in Figs. 1 to 4, the high-resistance slot-lying portion 31 extends forward, in a single-throw front-end high-resistance end-portion or terminal 311, to the commutator-neck or riser 38 of one of the bars of the commutator 10, thus making the front-end joint of the resistance-lead connection 30 which extends from the commutator 10 to the armature-winding coil-ends 27 and 28 in the rear of the armature.

From Figs. 1 to 4, it will thus be seen that I have provided a resistance-lead motor having full equalization, that is, an equalizing connection for every commutator-bar. These equalizer connections of the motor shown in Figs. 1 to 4 are connected at the coil-ends 27 and 28, ahead of the resistance-leads 30 or 31, thus equalizing the currents in the armature-winding 11. This is the usual practice in which equalizing connections are provided, in resistance-lead motors, when equalizing connections are provided at all, but heretofore it has not been possible to find suitable room, in radial depth, for an equalizing connection for every coil-end, especially with coil-ends at the rear end, away from the commutator.

It will be noted, in Figs. 1 to 4, that my invention utilizes double-throw copper end-terminals 34 and 35, at the rear end of the resistance-lead connections 30, for providing the rear-end equalizing cross-connections for the armature-winding 11.

In Fig. 5, I have shown how equalizing connections could also be easily provided for the commutator 10, so as to equalize the current in the brushes 40 which bear upon the commutator 10. This is a refinement which is not always needed. When it is needed, however, it can easily be provided by providing the forked or double-throw copper-ends 321 which are brazed, at scarfed joints 331, to the front ends of the slot-lying high-resistance portions 311, which, in this instance, are confined to relatively short lengths lying altogether in the bottom of the respective slots of the armature-core 9. These front-end copper terminals 321 fan out to commutator-bars which are spaced two pole-pitches apart, each bar, in this case, being connected to two copper-ends 321, coming in different directions from two different high-resistance portions 311, as will be readily understood from the previous description of the rear-end equalizing cross-connections.

In commutator-motors of the class to which my invention is more particularly applicable, it is customary to have only a relatively small number of slots in the armature-core 9, with a plurality of armature-coils 13 per slot, either two or three or four, or even more coils per slot. The number of bars of the commutator 10 is equal to the number of the armature-coils 13, so that a single coil is connected between adjacent commutator-bars, thus reducing the voltage per bar to a minimum, which is a critical feature in commutation. Heretofore, it has been possible, sometimes, in resistance-lead motors, to provide an equalizing connection per slot, but it has never been possible, before, to my knowledge, to provide an equalizing connection per bar. In the particular form of embodiment of my invention, as shown in Figs. 1 to 3, there are three coils per slot, or six coil-sides 14 in each slot, and three high-resistance lead-portions 31, lying in the bottom of each slot, and going to successive commutator-bars, as indicated by the bars 20, 21 and 22 in Fig. 3.

The manufacturing processes, or assembling operations, of my new combined resistance-lead connections and equalizing cross-connections are extremely simple, and result in considerable economies in the cost of the manufacture, even aside from considerations of functional advantages. Thus, in assembling the windings, the resistance-lead connections 30, having portions 31 lying in the bottoms of the slots, will naturally be assembled first. Before the armature-winding 11 is added, the front ends of the resistance-leads 31 may be soldered in the commutator-bars by pot-soldering or dipping in a pot of molten solder. In like manner, after the armature-winding 11 has been put in place, the entire set of rear-end connectors 36 may be soldered, all at once, by the inexpensive pot-soldering method, after applying temporary wedges (not shown) between the connectors. I have thus provided a compact, rugged assembly, which is inexpensive to manufacture, and which, for the first time, provides for full equalization, of either the armature-winding, or the commutator, or both, in a resistance-lead motor.

I claim as my invention:

1. A dynamo-electric machine, comprising a stationary field-member and a rotor-member rotatably supported within the field-member, said rotor-member comprising a slotted armature-core, a multi-bar commutator disposed at the front end of the armature-core, armature-winding coils having coil-sides disposed in slots of said armature-core and having coil-ends extending to the rear, a resistance-lead connection extending from each commutator-bar to the rear, each resistance-lead connection comprising a portion made of a relatively high-resistance material disposed in a slot of the armature-core, each resistance-lead connection further comprising a double-throw double-layer end-winding terminal made of a relatively low-resistance material connected to the rear end of said portion of high-resistance material and fanning out in both directions around the rotor-member to two equipotential armature-winding coil-ends two pole-pitches apart, and a series of rear-end connectors, each connector joining two coil-ends of two different armature-winding coils and two oppositely fanning end-winding terminals coming in opposite directions from two different resistance-lead connections, whereby said double-throw end-winding terminals serve as equalizing cross-connections for the armature-winding.

2. A dynamo-electric machine, comprising a stationary field-member and a rotor-member rotatably supported within the field-member, said rotor-member comprising a slotted armature-core, a multi-bar commutator disposed at the front end of the armature-coil, armature-winding coils having coil-sides disposed in slots of said armature-core and having coil-ends extending to the rear, a resistance-lead connection extending from each commutator-bar to the rear, each resistance-lead connection comprising a central portion made of a relatively high-resistance material disposed in a slot of the armature-core, each resistance-lead connection further comprising a front-end double-throw double-layer end-winding terminal made of a relatively low-resistance material connected to the front end of said central portion and fanning out in both directions around the rotor-member to two equi-potential commutator-bars two pole-pitches apart, each bar being connected to two oppositely fanning front-end terminals coming in opposite directions from two different resistance-lead connections, whereby said front-end terminals serve as equalizing cross-connections for the commutator, each resistance-lead connection further comprising a rear-end double-throw double-layer end-winding terminal made of a relatively low-resistance material connected to the rear end of said central portion and fanning out in both directions around the rotor-member to two equipotential armature-winding coil-ends two pole-pitches apart, and a series of rear-end connectors, each connector joining two coil-ends of two different armature-winding coils and two oppositely fanning rear-end terminals coming in opposite directions from two different resistance-lead connections, whereby said rear-end terminals serve as equalizing cross-connections for the armature-winding.

3. A commutator-type dynamo-electric machine, comprising a stationary field-member and a rotor-member rotatably supported within the field-member, said rotor-member comprising a slotted armature-core, a multi-bar commutator disposed at the front end of the armature-core, a closed armature-winding circuit comprising a plurality of serially connected armature-coils, each armature-coil comprising two coil-side portions lying in two different layers in two different slots of the armature-core, each armature-coil further comprising front-end and rear-end end-winding portions disposed in two layers of winding-conductors having throws in opposite directions around the rotor-member, double-layer double-throw half-diamond-type rear-end equalizing cross-connections having their rearward diamond-points connected to different rear-end connections between different pairs of armature-coils, and a resistance-lead connection extending forward from each forward diamond-point of said rear-end equalizing cross-connections to the commutator, each resistance-lead connection comprising a slot-lying portion.

4. A commutator-type dynamo-electric machine, comprising a stationary field-member and a rotor-member rotatably supported within the field-member, said rotor-member comprising a slotted armature-core, a multi-bar commutator disposed at the front end of the armature-core, double-layer double-throw half-diamond-type front-end equalizing cross-connections having their forward diamond-points connected to different commutator-bars, a closed armature-winding circuit comprising a plurality of serially connected armature-coils, each armature-coil comprising two coil-side portions lying in two different layers in two different slots of the armature-core, each armature-coil further comprising front-end and rear-end end-winding portions disposed in two layers of winding-conductors having throws in opposite directions around the rotor-member, double-layer double-throw half-diamond-type rear-end equalizing cross-connections having their rearward diamond-points connected to different rear-end connections between different pairs of armature-coils, and slot-lying resistance-lead connections joining the several rearward diamond-points of the front-end equalizing cross-connections to the corresponding forward diamond-points of the rear-end equalizing cross-connections.

5. A commutator-type dynamo-electric machine, comprising a stationary field-member and a rotor-member rotatably supported within the field-member, said rotor-member comprising a slotted armature-core, a multi-bar commutator disposed at the front end of the armature-core, a closed armature-winding circuit comprising a plurality of serially connected armature-coils, each armature-coil comprising two coil-side portions lying in two different layers in two different slots of the armature-core, each armature-coil further comprising front-end and rear-end end-winding portions disposed in two layers of winding-conductors having throws in opposite directions around the rotor-member, there being as many commutator-bars as there are rear-end end-winding connections between different pairs of armature-coils, and resistance-lead connections extending between corresponding commutator-bars and rear-end end-winding connections between different pairs of armature-coils, each resistance-lead connection comprising a slot-lying portion made of a relatively high-resistance material, and double terminal end-winding connections made of a relatively low-resistance material joined to, and extending from, at least one end of each slot-lying high-resistance portion, said double terminal end-winding connections being disposed in two layers having throws in opposite directions, the overall throw of each double terminal end-winding connection for each slot-lying high-resistance portion being two pole-pitches, whereby said double terminal end-connections serve as equalizing cross-connections.

6. The invention as defined in claim 1, characterized by the number of armature-coils and commutator-bars and slot-lying high-resistance portions being a multiple of the number of slots in the armature-core.

7. The invention as defined in claim 2, characterized by the number of armature-coils and commutator-bars and slot-lying high-resistance portions being a multiple of the number of slots in the armature-core.

8. The invention as defined in claim 3, characterized by the number of armature-coils and commutator-bars and slot-lying high-resistance portions being a multiple of the number of slots in the armature-core.

9. The invention as defined in claim 4, characterized by the number of armature-coils and commutator-bars and slot-lying high-resistance portions being a multiple of the number of slots in the armature-core.

10. The invention as defined in claim 5, characterized by the number of armature-coils and commutator-bars and slot-lying high-resistanc portions being a multiple of the number of slots in the armature-core.

HERBERT G. JUNGK.

REFERENCES CITED

The following references are of record in the file of this patent:

UNITED STATES PATENTS

| Number | Name | Date |
| --- | --- | --- |
| 1,017,071 | Bache-Wiig | Feb. 13, 1912 |
| 783,498 | Arnold et al. | Feb. 28, 1905 |